United States Patent

[11] 3,561,700

[72] Inventors George Adams;
John Hawkins, New York, N.Y.
[21] Appl. No. 823,922
[22] Filed May 12, 1969
[45] Patented Feb. 9, 1971
[73] Assignee United Research Laboratory
New York, N.Y.
a corporation of New York

[54] TAPE APPARATUS INCLUDING TAPE SPEED SENSING DEVICE
9 Claims, 4 Drawing Figs.

[52] U.S. Cl. .......... 242/206, 226/35; 242/75.47
[51] Int. Cl. .......... B11b 15/32; G03b 1/04, G11b 15/60
[50] Field of Search .......... 242/206—210, 75.47, 75.5; 226/24, 29, 30, 34, 35, 181

[56] References Cited
UNITED STATES PATENTS

| | | | |
|---|---|---|---|
| 2,539,858 | 1/1951 | Offutt | 242/75.5 |
| 2,671,619 | 3/1954 | DeClerck | 242/75.51 |
| 3,023,942 | 3/1962 | Bakos | 226/50 |
| 3,085,759 | 4/1963 | Guest | 242/210 |

*Primary Examiner*—Leonard D. Christian
*Attorney*—Posnack, Roberts & Cohen

ABSTRACT: A magnetic wheel having a plurality of north and south poles arranged on the shaft of a takeup reel of a tape apparatus in which tape is fed to the takeup reel via a capstan from a supply reel. The tape is urged against the capstan by a pinch roller and the magnetic wheel is employed to generate a signal which is employed to disengage the pinch roller under certain circumstances in which the tape might otherwise break.

INVENTORS
GEORGE ADAMS
JOHN HAWKINS
BY
Posnack, Roberts & Cohen
ATTORNEYS

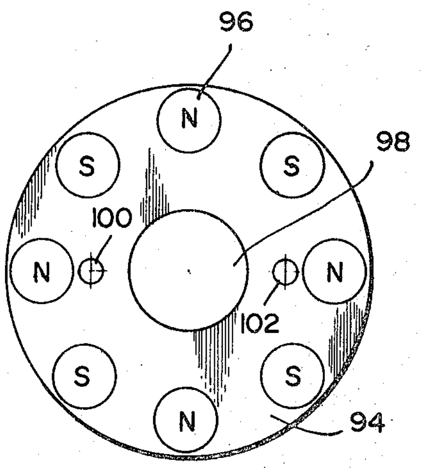
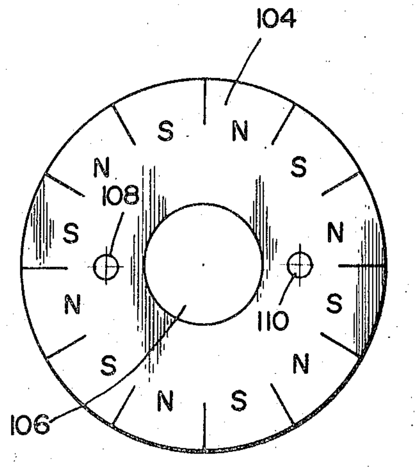
FIG. 2 FIG. 3
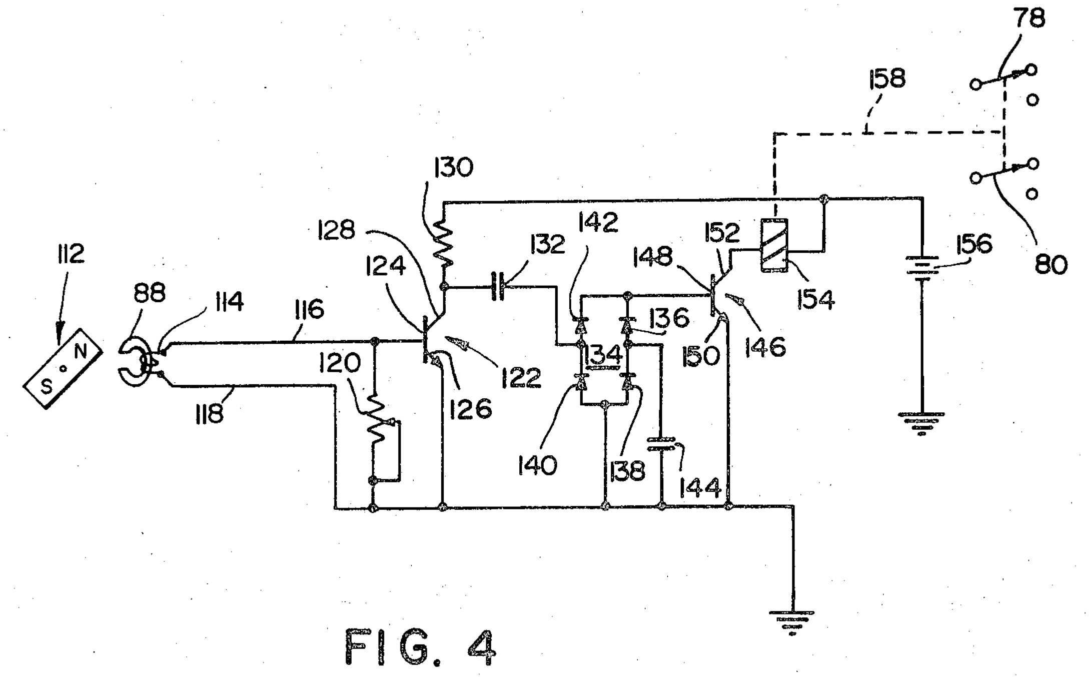
FIG. 4
INVENTORS
GEORGE ADAMS
JOHN HAWKINS
BY
Posnack, Roberts & Cohen
ATTORNEYS

TAPE APPARATUS INCLUDING TAPE SPEED SENSING DEVICE

BACKGROUND

In the operation of tape equipment there are various modes which can be selectively employed. These modes include, by way of example, the play mode, the fast forward mode, the stop mode and the like.

In the play mode, the brakes which are provided in association with the supply and takeup reels are released and the pinch roller is operated to clamp the tape against the associated capstan. The motor for the takeup reel and the capstan drive shaft are simultaneously turned on.

In the fast forward mode the motor for the takeup reel is switched to high speed then the brakes are put into or maintained in released condition by an appropriate switch. The pinch roller is disengaged from the capstan so that the tape can move freely without restraint therebetween.

In the stop mode, which can be manually or sometimes automatically effected, the brakes are applied and there is an interlocking of a switch or contact which prevents the pinch roller from being applied against the capstan.

With respect to the stop mode, the momentum of the moving parts requires a finite period in which to be dissipated and it sometimes takes a period of about 5 seconds, at the end of which the takeup reel and associated components will come to a complete stop. It is, however, possible during this period to operate the play mode control before the tape comes to a complete stop and this will cause the pinch roller to be applied to the capstan which will cause the tape to break if the remaining tape speed is too high.

SUMMARY OF THE INVENTION

It is an object of the invention to provide an improved tape employing system in which the above noted difficulty is avoided.

It is another object of the invention to provide improved elements and components adapted for use in a tape employing system which prevent tape breakage for the reasons noted above.

Yet another object of the invention is to provide for the use of simplified tape speed sensing components and elements which are readily and economically manufactured and which may be used with equal facility in the original manufacture of tape employing equipment or for purposes of modifying tape employing equipment which is already in use.

In achieving the above and other objects of the invention, there is provided a tape apparatus comprising tape supply and takeup means such as reels with a capstan and pinch roller adapted for cooperatively engaging the tape between such reels. Moreover, there is provided a signal generating means associated with at least one of the reels and responsive to the speed of rotation thereof to generate a signal for disengaging the capstan and pinch roller.

The signal generating means, according to a feature of the invention, includes a magnetic wheel located on and rotating with one of the shafts on which the aforesaid reels are mounted, there being provided a sensor head adjacent the reel for generating signals upon rotation thereof.

According to one aspect of the invention, as will be seen hereinafter, the magnetic wheel is a monolithic structure of permanent magnetic material having regularly spaced north and south poles peripherally distributed thereabout.

According to another aspect of the invention, the wheel is a solid support structure of nonmagnetic material in which magnetic pieces are distributed.

According to the invention, brake means are associated with at least one of the aforesaid shafts and can be coupled to and controlled by the signal generating means. Solenoids may be employed to operate the pinch roller and brake means and the solenoids in turn will be coupled to the signal generating means.

The signal generating means may, in accordance with a further feature of the invention, embody a signal level adjustment whereby the threshold level of response may be selected as desired.

In accordance with the invention, and as will be shown in detail hereinafter, the signal generating means will include an amplifier coupled to the aforesaid level adjusting device and feeding into a rectifier bridge which in turn is connected to a relay driver which operates a relay which is incident to the required functions. There may be provided switches in association with the relay means, a cooperation being effected therebetween to control the pinch roller and brakes.

Other objects and features of the invention, as well as advantages thereof, will be found in the detailed description which follows hereinbelow.

DRAWING

FIG. 2 illustrates one speed sensing component employed in the apparatus of FIG. 1

FIG. 3 illustrates a second speed sensing component employed as an alternative to the component illustrated in FIG. 2; and FIG. 4 illustrates schematically the circuit component employed in association with the speed sensor components illustrated in FIGS. 2 and 3.

DETAILED DESCRIPTION

Figure 1:
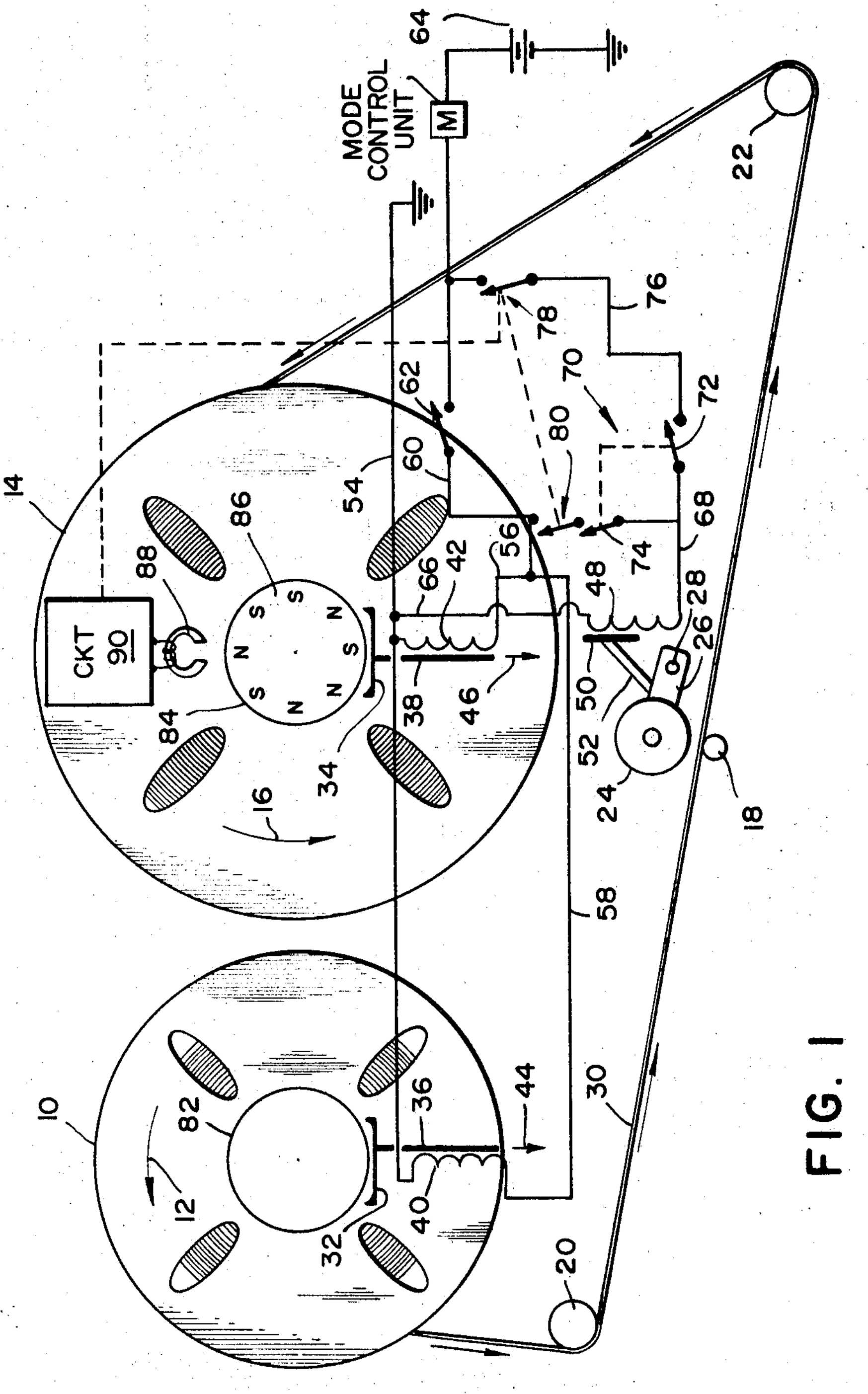
FIG. 1 is a diagrammatic illustration of a tape employing system embodying a speed sensing component in accordance with the invention.

The tape employing apparatus illustrated in FIG. 1 comprises generally a tape supply reel 10 rotatable in the direction indicated by arrow 12 for purposes of forward motion and a takeup reel 14 rotatable in the direction indicated by arrow 16 for purposes of forward motion. Also included is a capstan 18 located between two guide rollers 20 and 22. The capstan is opposed by a pinch roller 24 pivotally mounted on an arm 26 for displacement about a pivot pin 28. Pinch roller 24 is an idler roller which is intended to sandwich tape 30 against capstan 18 which is a positively driven component driven by a motor (not shown). The takeup reel 14 is also a positively driven component likewise driven by a motor, which is not shown for purposes of simplification.

The tape 30 is driven from supply reel 10 around guide roller 20 between capstan 18 and pinch roller 24 around guide roller 20 and onto takeup reel 16 when the play or fast forward modes of operation are involved.

Diagrammatically illustrated as associated with the shafts of reels 10 and 14 are brakes 32 and 34. These are respectively installed on armatures 36 and 38 of solenoids 40 and 42. When current is passed through solenoids 40 and 42, armatures 36 and 38 are displaced downwardly as indicated by arrows 44 and 46 and the brakes 32 and 34 are released.

A solenoid 48 is additionally employed and its armature 50 is connected by a link 52 to the arm 26 of pinch roller 24 to control the disposition of the latter. When there is no current passing through the solenoid 48 the pinch roller 24 is in a position of rest withdrawn from capstan 18. When, on the other hand, current is passed through solenoid 48, armature 50 is effective through link 52 and arm 26 to apply the pinch roller 24 against capstan 18 to sandwich the tape thereagainst. In these circumstances, the capstan and pinch roller may be considered as being engaged.

The solenoids 40 and 42 are connected via a line 54 to ground. They are also connected via lines 56 and 58 to a line 60 connected through a switch 62 to a source 64 of voltage which is sufficient to drive the solenoids 40 and 42.

Solenoid 48 is connected via line 66 and thence via line 54 to ground and on the other hand via a line 68 to a switch 70 consisting of ganged switch sections 72 and 74. Switch section 72 is connected via a line 76 and a switch section 78 to the aforesaid source 64. There is ganged together with switch section 78 a second switch section 80, these two switch sections actually being constituted by relay contacts as discussed in greater detail hereinafter.

There is diagrammatically indicated in FIG. 1 a mode control unit M. This mode control unit is of well-known construction and includes a plurality peripherally buttons or switches which may be manually or automatically operated for purposes of selecting, for example, play, fast forward, or stop modes of operation. The details of the mode control unit are not essential to an understanding of the invention. However, for purposes of explanation, it may be assumed that the mode control unit controls solenoids or relays which in turn control among other things the switches 62 and 70.

Assuming that the play mode has been selected by operation of the mode control unit, switch 62 and switch 72 are closed. It will now be assumed that the normal condition of switch sections 78 and 80 is constituted by the closed condition which, in fact, is the normal condition maintained by the sensor circuit to be discussed hereinafter. By reason of switches 62 and 74 being closed, current is passed through solenoids 40 and 42 to release brakes 32 and 34 and current is applied through solenoid 48 to dispatch pinch roller 24 towards capstan 18. Simultaneously, the drive motors for the capstan and for takeup reel 14 are switched on and the tape 30 is taken from supply reel 10 and wound onto takeup reel 14. During this movement, the tape will move past a reading head (not shown) and the resulting electrical signal will be passed into an audio system. If the mode control unit is operated to provide the fast forward mode, the motor driving takeup reel 14 is accelerated and switch 70 opened to disengage the pinch roller 24 from capstan 18. If the stop mode is desired, the mode control unit is operated to apply brakes 32 and 34 to the shafts of reels 10 and 14 and the pinch roller 24 is displaced away from the capstan 18. The shaft of reel 10 is indicated at 82 and the shaft of the takeup reel 14 is obscured by a magnetic wheel to be described hereinafter; however, such shafts may be generally considered as existing in the position indicated by reference 84.

Assuming now, and by way of example, that the stop mode has been selected. A period of time will be consumed in the natural decay of the speed of shafts 82 and 84 despite the fact that they are engaged by brakes 32 and 34. This is especially so when the stop mode is selected to interrupt the fast forward mode, in which event as much as, for example, 5 seconds may be consumed in decelerating the shafts and their respective reels. If in an automatic operation or under the control of an operator the play mode is selected before the shafts have come to a complete halt, the pinch roller 24 will be urged against the capstan 18 thereby engaging the tape which will as a consequence be torn or broken. This can result in a substantial waste of material and time and the cost of tapes thus destroyed may be substantial. Additionally, there is the possibility that certain of such tapes may not be replaceable. Accordingly, it is an object of the invention to prevent such destruction.

To this end there is mounted on the shaft 84 a magnetic wheel 86 provided with a plurality of interdigitated north and south poles peripherally distributed thereabout. Adjacent such wheel is provided a sensor head 88 with which is associated a sensor head circuit 90, the armature of which is connected to the aforesaid switch sections 78 and 80. Magnetic wheel 86 and the associated components acknowledge the rotation of reel 14 by producing a signal which will open switch sections 78 and 80. As a result of this opening electrical power cannot be supplied to the solenoid 48 which will remain disengaged from the capstan 18 or will be disengaged therefrom if previously engaged therewith.

Examples of wheels which can be employed in accordance with the invention are provided in FIGS. 2 and 3. In FIG. 2 appears a circular solid body 94 of plastic or like nonmagnetic material in which are imbedded permanent magnetic pieces 96, there being an appropriate disposition of north and south poles in interdigitated relationship peripherally around the body 94. Said body is provided with a body 98 centrally located therein the accommodate an end of the associated shaft, there being moreover provided holes 100 and 102 to enable the body 94 to be screwed to a flange mounted on the associated shaft.

It should be noted that the construction must be able to rotate up to for example, 6,000 r.p.m. without being destroyed. However, this has not been found to constitute a serious obstacle to the construction.

An alternative construction is illustrated in FIG. 3 wherein a monolithic body of permanent magnetic material is illustrated. This body is indicated at 104 and has permanently formed therein a plurality of interdigitated north and south poles preferably at least eight in number.

The body 104 is provided with a central opening 106 to accommodate the end of the associated shaft, there being moreover provided holes 108 and 110 for fastening the body to a flange mounted on the aforesaid shaft if desired. The body 104 is moulded in one piece and is preferably ground to a smooth finish although porosity and surface imperfections are tolerable. A suitable magnetic material is constituted, for example, by isotropic magnetic alloy Indox 1 (sintered).

It is of course preferable in association with the aforesaid wheels that the end faces thereof be parallel and as nearly perpendicular to the axis of rotation thereof as possible so that there is no fluctuation due to eccentricity in the electrical signal which is generated.

FIG. 4 diagrammatically illustrates the aforesaid wheels at 112. The sensor head 88 is provided with a coil 114 connected via lines 116 and 118 to a potentiometer 120. This potentiometer enables the selection of the input threshold level and makes sure that the aforesaid pinch roller control is not responsive to speeds equal to or less than the speed associated with a normal play mode.

A transistor 122 is included in the sensor circuit. This transistor includes a base 124 connected to the line 116 and an emitter 126 connected to the line 118. Thus the base and emitter are connected in parallel with the potentiometer 120. The collector 128 is connected to a resistor 130 and also via a capacitor 132 to a rectifier bridge 136 consisting of rectifiers 136, 138, 140 and 142. A smoothing capacitor 144 is connected between the bridge and ground.

The circuit further includes a relay driver transistor 146 including a base 148 connected to the rectifier bridge, an armature 150 connected to ground and a collector 152 connected to one end of solenoid 154, the other end of which is connected to a power source 156 and to resistor 130. The armature of the solenoid is diagrammatically indicated at 158 and this in turn is connected to switch sections 78 and 80 mentioned hereinabove, with respect to FIG. 1.

From what has been stated above, it will be seen that the speed of rotation of magnetic structure 112 will excite a signal in coil 114 installed on sensor head 88 which in turn will produce an input signal in the sensing circuit depending upon the threshold established by potentiometer 120. The signal will be amplified by transistor 122 and the associated components and rectified by bridge 134 and supplied to relay driver transistor 146 to drive the solenoid 154. When the speed of rotation of magnetic element 112 exceeds a certain level, switch sections 78 and 80, which are normally closed, will be opened.

Referring next to FIG. 1, it is seen that the opening of these switch sections will prevent power from being applied to solenoid 48 as aforesaid, whereupon the pinch roller 24 will not be able to sandwich the tape 30 against capstan 18. This means that should the stop mode be selected to terminate the fast forward mode, the tape cannot be sandwiched by pinch roller 24 against capstan 18 until the speed of takeup reel 14 has decelerated sufficiently. This in turn will prevent the tearing of tape and the destruction thereof under the circumstances which have been outlined above.

It should be noted that the switch sections 78 and 80 can be used for other general purposes such as, for example, to defeat the application of brakes 32 and 34 to their respective shafts. As a matter of fact, it will be noted that switch section 80 is employed in association with switch section 74 to provide for passing the switch 62 under certain conditions. Thus, for example, assuming that the switch 62 is open, a closing of switch 70 while switch section 80 is closed will operate to supply power to solenoids 40 and 42 thereby preventing the application of brakes 32 and 34.

It is to be understood that the apparatus and circuitry discussed above is equally applicable to the reverse situation of transporting tape in a rewind operation from the takeup reel back to the supply reel.

We claim:

1. Tape apparatus comprising tape supply and takeup means operable at various speeds, a capstan and pinch roller adapted for cooperatively engaging the tape between said supply and takeup means, and signal generating means associated with one of the first said means and responsive to the speed thereof to generate a signal for disengaging the capstan and pinch roller.

2. Apparatus as claimed in claim 1, wherein said supply and takeup means include shafts and said signal generating means includes a magnetic wheel on and rotating with one of the shafts and a sensor head adjacent the wheel and generating signals upon rotation of the wheel.

3. Apparatus as claimed in claim 2, wherein said wheel is a monolithic structure of permanent magnetic material having regularly spaced north and south poles peripherally distributed thereabout.

4. Apparatus as claimed in claim 2, wherein said wheel includes a solid support of nonmagnetic material and magnetic pieces distributed throughout said support.

5. Apparatus as claimed in claim 2, comprising brake means associated with at least one of said shafts and coupled to and controlled by said signal generating means.

6. Apparatus as claimed in claim 5, comprising solenoids coupled to said signal generating means and operating the pinch roller and break means.

7. Apparatus as claimed in claim 6, wherein the signal generating means includes signal level adjustment means coupled to said head.

8. Apparatus as claimed in claim 7, wherein the signal generating means includes an amplifier coupled to the adjustment means, a rectifier means coupled to the amplifier, a relay driver coupled to said rectifier, and relay means coupled to and driven by said driver and controlling said solenoids.

9. Apparatus as claimed in claim 8 comprising switches in series with the solenoids associated with said brake means and pinch roller, said relay means including contact elements adapted to cooperate with the switch in series with the pinch roller solenoid to bypass the switch in series with the brake means.